United States Patent [19]
Franaszek

[11] Patent Number: 5,264,842
[45] Date of Patent: Nov. 23, 1993

[54] GENERALIZED USAGE OF SWITCH CONNECTIONS WITH WAIT CHAIN

[75] Inventor: Peter A. Franaszek, Katonah, N.Y.

[73] Assignee: International Business Machines Corporation, Armonk, N.Y.

[21] Appl. No.: 722,794

[22] Filed: Jun. 28, 1991

[51] Int. Cl.⁵ .............................................. H04Q 3/00
[52] U.S. Cl. .......................... 340/825.79; 340/825.85
[58] Field of Search ............. 340/825.9, 825.8, 825.83, 340/825.86, 825.87, 825.85

[56] References Cited
U.S. PATENT DOCUMENTS

| | | | |
|---|---|---|---|
| 4,245,214 | 1/1981 | Beirne | 340/825.79 |
| 4,922,245 | 5/1990 | Hwang et al. | 340/825.79 |
| 4,929,939 | 5/1990 | Varma et al. | 340/825.79 |

*Primary Examiner*—Donald J. Yusko
*Assistant Examiner*—J. Giust
*Attorney, Agent, or Firm*—Whitham & Marhoefer

[57] ABSTRACT

Requestors for a busy port in a multi-port communication system are enqueued in wait chains. The connectivity of a crossbar switch is employed to store the wait chains. Elements of the wait chain are modified to provide the right connections; that is, a group of ports are connected by what may be regarded as a form of linked list but where the pointers are comprised of connections in the switch itself. These connections are used both for storing the list structure as well as passing information.

10 Claims, 7 Drawing Sheets

GENERALIZED USAGE OF SWITCH CONNECTIONS WITH WAIT CHAIN

BACKGROUND OF THE INVENTION

1. Field of the Invention

The present invention generally relates to multiplex interconnection networks for communications systems, and especially digital communications systems for parallel computers, and, more particularly, to a switching network in which switch connections are used to establish "waiting chains" for ports which desire to communicate with a single port.

2. Description of the Prior Art

High performance computer systems frequently involve the use of multiple central processing units (CPUs), each operating independently, but occasionally communicating with one another or with memory devices when data needs to be exchanged. A switching system, such as a crossbar switch, is used to interconnect CPUs and memory devices. This type of system is illustrated in FIG. 1 which shows a large number of CPUs 10, each operating independently and in parallel with each other. Each of the CPUs 10 occasionally requires access to one of several memories 12. Each CPU has an input/output (I/O) path 14, and each memory device has an I/O path 16. The paths 14 and 16 can be buses and may be duplicated to provide full-duplex communication. Selective connection of an I/O path 14 to an I/O path 16 is performed by a switch 18, such as a crossbar switch.

U.S. Pat. No. 4,605,928 to C. J. Georgiou describes a crossbar switch composed of an array of smaller crossbar switches, each on a separate integrated circuit (IC). U.S. Pat. No. 4,360,045 to C. J. Georgiou describes a controller for the crossbar switch. This particular controller must sequentially service multiple ports requesting connection through the crossbar switch. U.S. Pat. No. 4,635,250 to Georgiou and U.S. Pat. No. 4,875,704 to C. J. Georgiou et al. describe switching systems which uses a one sided cross-point switching matrix for establishing connections between pairs of port adapters in a communication system. The switching matrix controllers of these switching systems can only connect currently available port adapters and cannot establish a waiting queue.

Consider an $N \times N$ crossbar switch used for full duplex connections between some number M of devices with a total of $M \leq N$ ports $P_1, P_2, \ldots, P_M$. Suppose port $P_i$ makes a request to be connected with port $P_j$, but port $P_j$ is currently busy (e.g., it is connected to port $P_k$). Two alternatives are to have port $P_i$ try again or to have port $P_i$ simply wait until the switch controller(s) indicate that port $P_j$ is free. The latter alternative is sometimes referred to as "camp-on" and is usually obtained by having the controller(s) maintain queues for each busy port. If the switch is large, and especially if it is organized as a modular structure with multiple parallel controller(s), then maintaining wait chains adds to the expense and overhead of the switch. It can also introduce substantial delays in path setup and message initiation. What is needed is a way to alleviate this problem.

SUMMARY OF THE INVENTION

It is therefore an object of the present invention to provide a method for enqueuing requestors for a busy port in a multi-port communication system.

It is another object of the invention to provide a multi-port communication system in which wait chains are maintained and connectivity is controlled to expedite transmission.

According to the invention, a method and apparatus are provided which employ the connectivity of a crossbar switch to store wait chains. Elements of the wait chain are modified to provide the right connections or, put another way, a group of ports are connected by what may be regarded as a form of "linked list" but where the pointers are comprised of connections in the switch itself. These connections are used both for storing the list structure as well as passing information.

The invention establishes connections between a subset $\{Q_j\}$ of a plurality of ports $P_1, \ldots, P_n$, where all ports of the subset desire to communicate with the same one of said ports $P_i$, where J is greater than or equal to one and less than or equal to N. A wait chain is established between all of the ports in the subset $\{Q_j\}$ by closing appropriate cross-points in the switching matrix so that each port in the subset $\{Q_j\}$ can transmit control information to a subsequent port of the subset $\{Q_j\}$. Control information is transmitted from a disconnecting port of the subset $\{Q_j\}$ to a subsequent port of the subset of ports $\{Q_j\}$, indicating that the disconnecting port no longer desires to communicate with port $P_i$. Then, appropriate cross-points in the switching matrix are set by a controller so that the subsequent port can communicate with port $P_i$.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
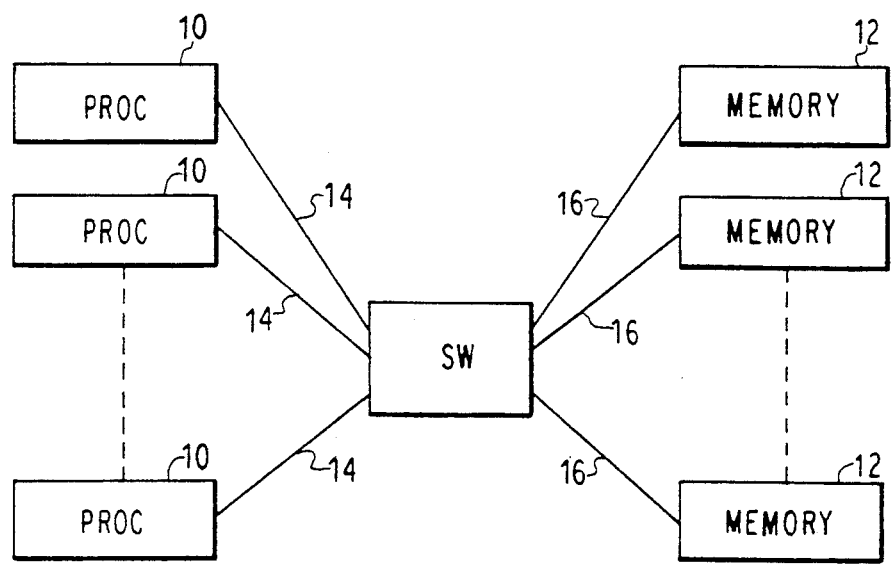
FIG. 1 is a block diagram of a typical multi-port communication system.
Figure 2:
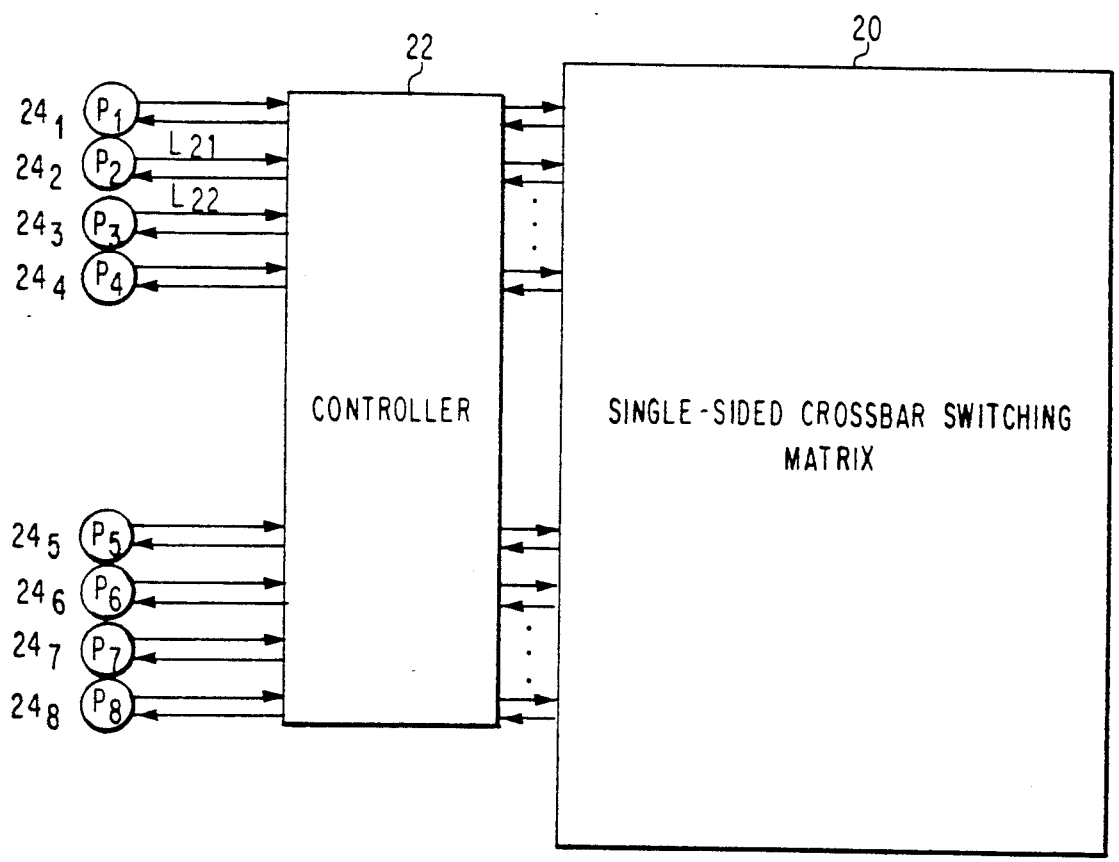
FIG. 2 is a block diagram illustrating a conventional single-sided crossbar switching matrix used in the practice of the invention.

Referring now to the drawings, and more particularly to FIG. 2, there is shown a block diagram of a single ended crossbar switching matrix 20 with a controller 22. There are eight device ports $24_1$ to $24_8$ illustrated example, but it will be understood by those skilled in the communications arts that in practice a greater number of device ports would be accommodated by the switching matrix 20. In the illustrated example, the controller 22 is connected to ports $24_1$ to $24_8$, here denoted as ports $P_1$ to $P_8$, respectively.

Figure 3:
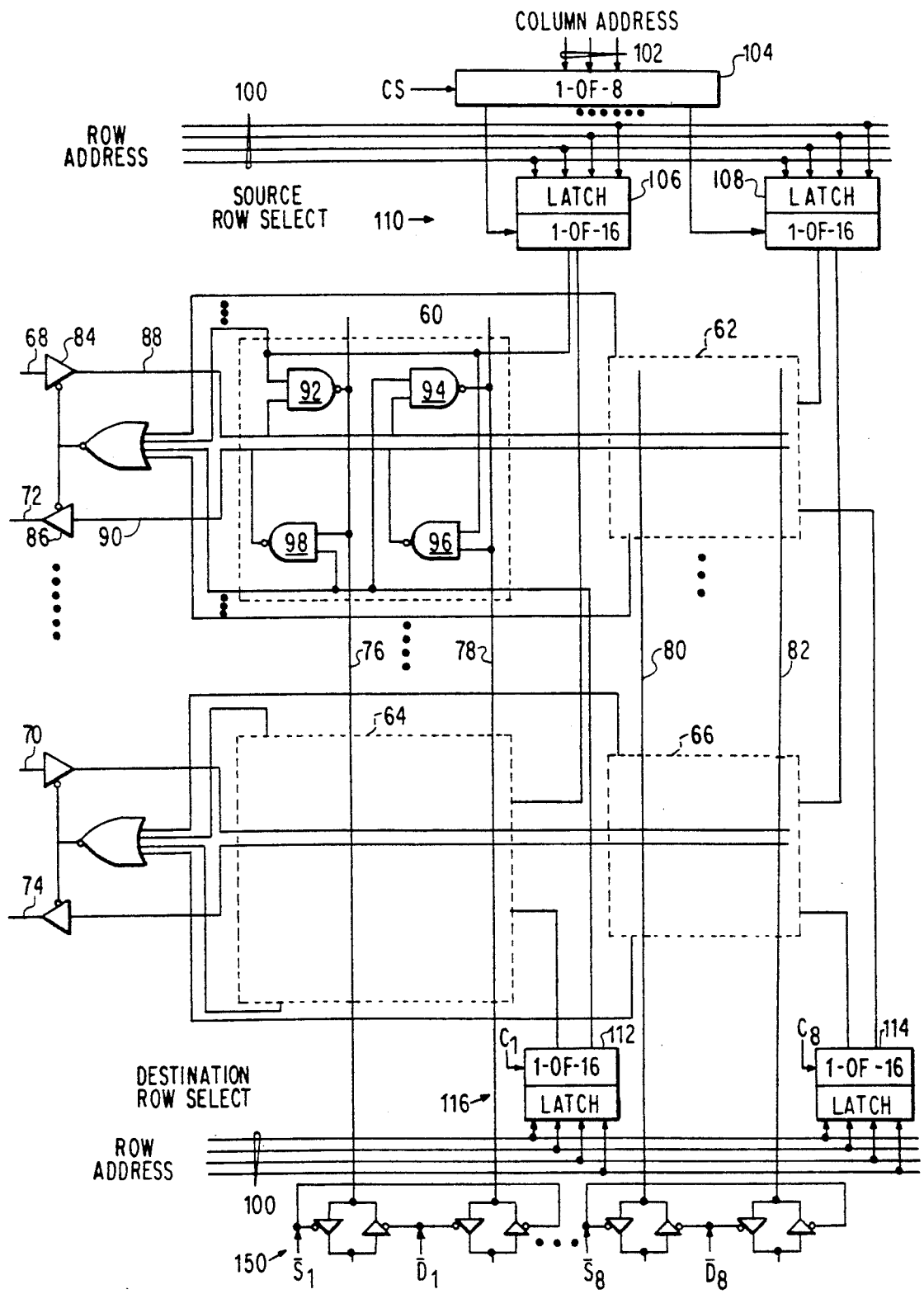
FIG. 3 is a block and logic diagram showing the details of a cross-point switch in the crossbar switching matrix shown in FIG. 2.

In a cross-bar switching matrix, there are a plurality of vertical busses intersecting a plurality of horizontal busses. At the intersections, or cross-points, of these busses are cross-point switches, an example of which is illustrated in the aforementioned U.S. Pat. No. 4,635,250 to Georgiou. FIG. 3 shows an array of four full-duplex cross point switches 60, 62, 64, and 66, only one of which, cross-point switch 60, is illustrated in detail. In a practical crossbar switching matrix, there will of course be many more such cross-point switches, and these are preferably implemented as an integrated circuit or a plurality of integrated circuits. The external lines are divided into input lines 68 and 70 and output lines 72 and 74. Each input line is paired with a corresponding output line to form a full-duplex communication line. The function of the controller 22 is to interconnect selected sets of the duplex external lines through internal vertical busses 76, 78, 80, and 82. In FIG. 3, all data lines are represented by heavy lines, while control lines controlling the switching operation are denoted by light lines.

Each row of the cross-points is connected to one pair of external lines, while each column is connected to one pair of internal vertical busses. Each of the input external lines, such as line 68, is connected to a receiver 84, and each output line, such as line 72, is connected to a driver 86. The receiver 84 and the driver 86 are connected respectively to an internal horizontal input bus 88 and an internal output bus 90 which pass through all the cross-point switches 60 and 62 in that row. If the cross-point switch 60 is selected, it simultaneously makes a connection between the input bus 88 and one of the internal vertical busses 76 and 78 and another connection between the output bus 90 and the other of the input vertical busses 76 and 78. Which of the two sets of connections is made depends on whether the external lines 68 and 72 are source lines or destination lines. The designation of the external lines 68 and 72 as either source or destination lines will determine the direction of data flow on the internal vertical busses 76 and 78.

With specific reference to the cross-point switch 60, each cross-point switch comprises four NAND gates 92, 94, 96, and 98. One input of each NAND gate is used as a control gate to turn on the switch when the control input is logical true. The other input is connected to a data line from which information is being received, and the complemented output of the NAND gate is connected to the data line onto which data is being transmitted from the gate. If the external lines 68 and 72 are source lines, then NAND gate 92 couples the input horizontal bus 88 onto the internal vertical bus 76, and NAND gate 96 couples the internal vertical bus 78 onto the output horizontal 90. On the other hand, if the external lines 68 and 72 are destination lines, then NAND gate 94 couples the input horizontal bus 88 onto the internal vertical bus 78, and NAND gate 98 couples the internal vertical bus 76 onto the output horizontal bus 90.

The control circuitry on the switching chip is designed so that any duplex cross-point switch 60-66 designated by a row address on a row address bus 100 and a column address on a column address bus 102 can be activated as a source or a destination cross-point. Latches are provided so that once a particular cross-point has been switched on, the controllers can proceed to different tasks with the cross-point left connected. A subsequent disconnect procedure is necessary to disconnect the cross-point. The column address bus 102 is connected to a one-of-eight column decoder 104, and a chip select control signal (CS) controls the connection or disconnection of any of the cross-point switches 60-66 on the chip and activates the decoding of the column decoder 104. Each column has a one-of-sixteen source row decoder 106 or 108 in a source row select section 110 and also a similar destination row decoder 112 or 114 in a destination row select section 116.

The cross bar switching matrix shown in FIG. 3 is but one of several switching matrices which may be used as the switching matrix 20 in the practice of the present invention. According to the invention, the connections of the cross-point switches in switching matrix 20 are used to establish a "linked list" of ports such that each port in turn receives notification that it can begin transmitting.

Figure 4:
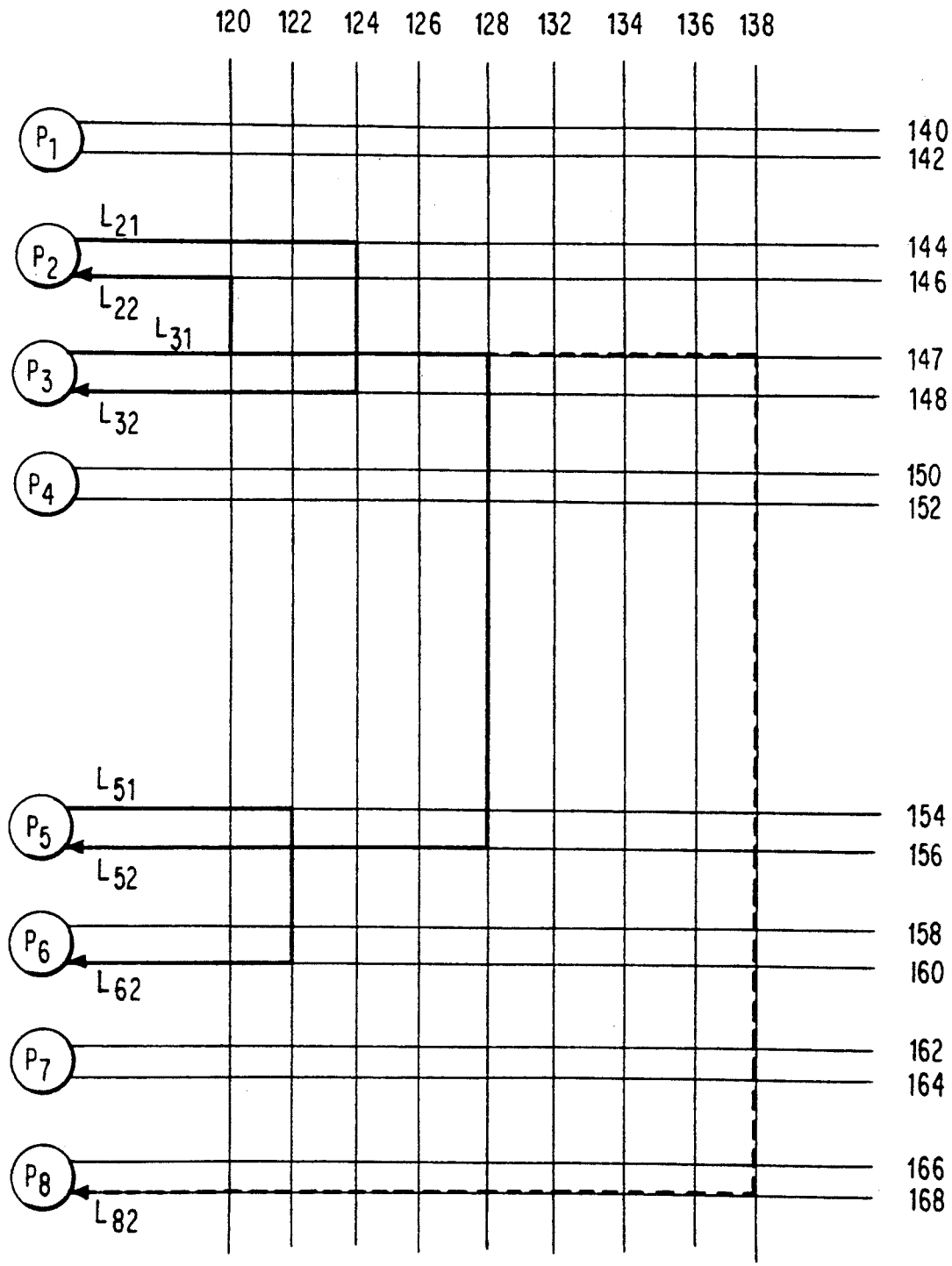
FIG. 4 is a simplified diagram based on FIG. 2 illustrating wait chains in the single-sided crossbar switching matrix.

FIG. 4 shows one example of wait chains established by the cross-point switches. The ports are designated as $P_i$, $i=1,2,\ldots,8$, each with an outgoing and an incoming transmission link which are denoted $L_{i1}$ and $L_{i2}$, respectively. The controller 22 (see FIG. 2) has the capability of making connections in some subset of the single sided crossbar switching matrix 20; that is, some subset of the vertical and horizontal busses. The first illustrated wait chain is for port $P_2$, shown connected to port $P_3$. That is, link $L_{21}$ is connected to link $L_{32}$ and link $L_{22}$ is connected to link $L_{31}$ (a full duplex connection). Ports $P_5$ and $P_6$ are, in this order, the ports that will next be connected to port $P_2$. A second wait chain, illustrated by dotted line, is for port $P_3$ linking port $P_8$ to port $P_3$.

In the following discussion, reference numerals 120-138 denote the vertical buses, and reference numerals 140-170 denote the horizontal buses which are involved in the wait chain examples. The first wait chain illustrated in FIG. 4 is stored as the following connections:

(a) link $L_{31}$ to link $L_{52}$, 147 to 128 to 156 in FIG. 4, and (b) link $L_{51}$ to link $L_{62}$, 154 to 122 to 160. The second wait chain illustrated in FIG. 4 is stored as the connections link $L_{31}$ to link $L_{82}$, 147 to 138 to 168.

The operations of enabling a next connection and an additional number to the wait chain are as follows:

Next transmission: Upon completion of its connection requirement to port $P_2$, port $P_3$ sends a disconnect command (e.g., in the form of a special delimiter on a data frame). Port $P_5$, the next port on the chain, is thus informed that it can transmit. Port $P_5$ then transmits to the controller 22 requesting connection to port $P_2$. As part of its request message, port $P_5$ identifies itself as a member of the wait chain for port $P_2$ so as not to be assigned to the end of the wait chain by the controller 22 and thereby allowing another port to intervene.

In the meantime, controller 22 has the information required to make the necessary connections between ports $P_2$ and $P_5$. Specifically, controller 22 deallocates vertical buses 120 and 124 by which the connections between ports $P_2$ and $P_3$ were made and allocates vertical buses 132 and 134 to make the connection between ports $P_2$ and $P_5$. Were there no other wait chains related to port $P_3$, the controller 22, using the address supplied in the disconnect command from port $P_3$, would also disconnect port $P_3$ from row buses 147 and 148. Port $P_5$ remains connected to row busses 154 and 156. The required connections for port $P_5$ can be overlapped with the delay in data transmission from port $P_5$.

Figure 5:
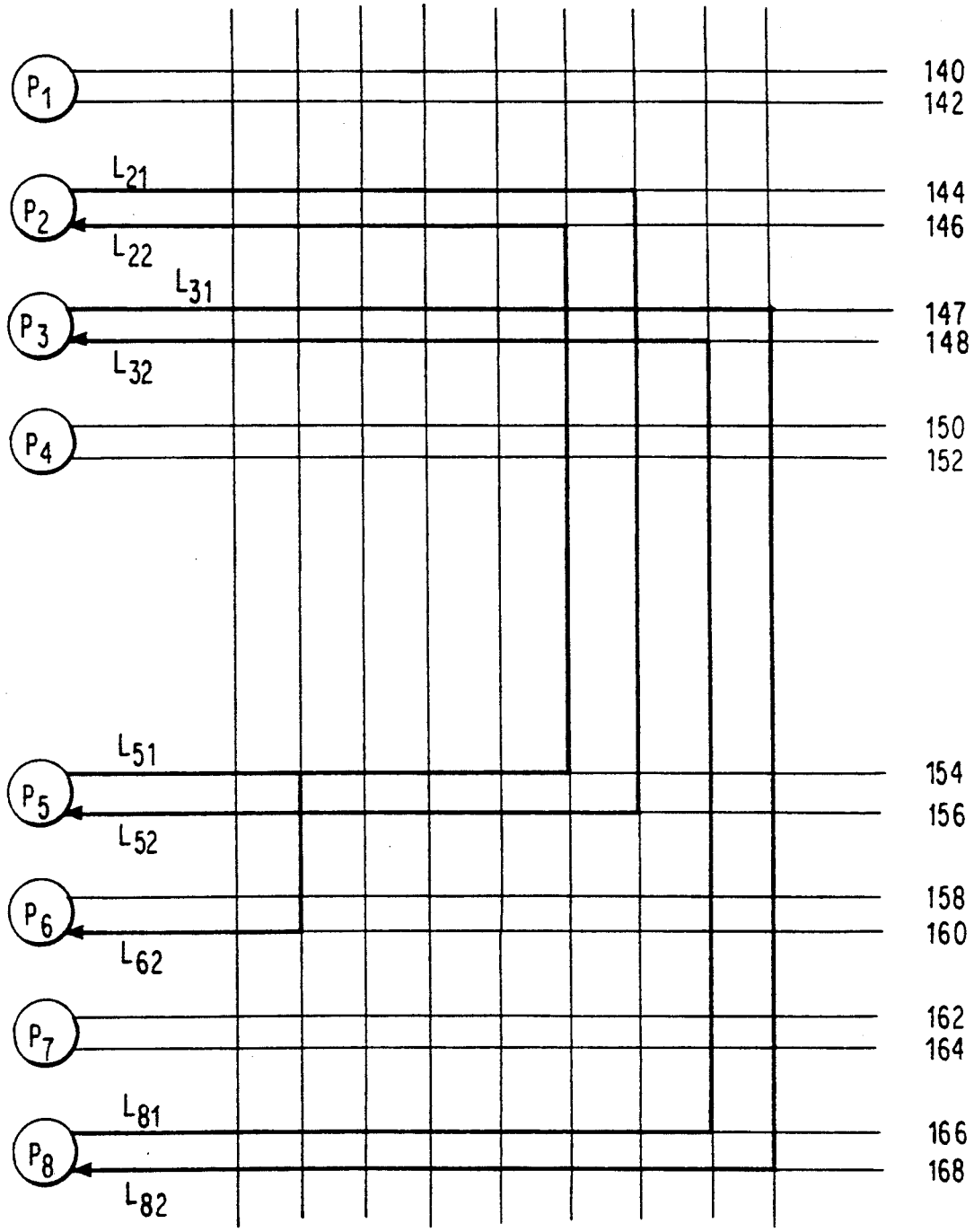
FIG. 5 is a simplified diagram showing the next sequential connection in the wait chains illustrated in FIG. 4.

Port $P_8$ also hears the disconnect command from port $P_3$, and since it is waiting for a connection to port $P_3$, port $P_8$ transmits a connect request message to the controller 22. As part of its request message, port $P_8$ identifies itself as a member of the wait chain for port $P_3$. The controller having already deallocated vertical buses 120 and 124
connecting ports $P_2$ and $P_3$, now allocates vertical buses 136 and 138 to make the connections between ports $P_3$ and $P_8$. Port $P_3$ remains connected to row buses 147 and 148, and in addition to row bus 168, port $P_8$ is connected to row bus 166. The resulting connections are as shown in FIG. 5.

Figure 6:
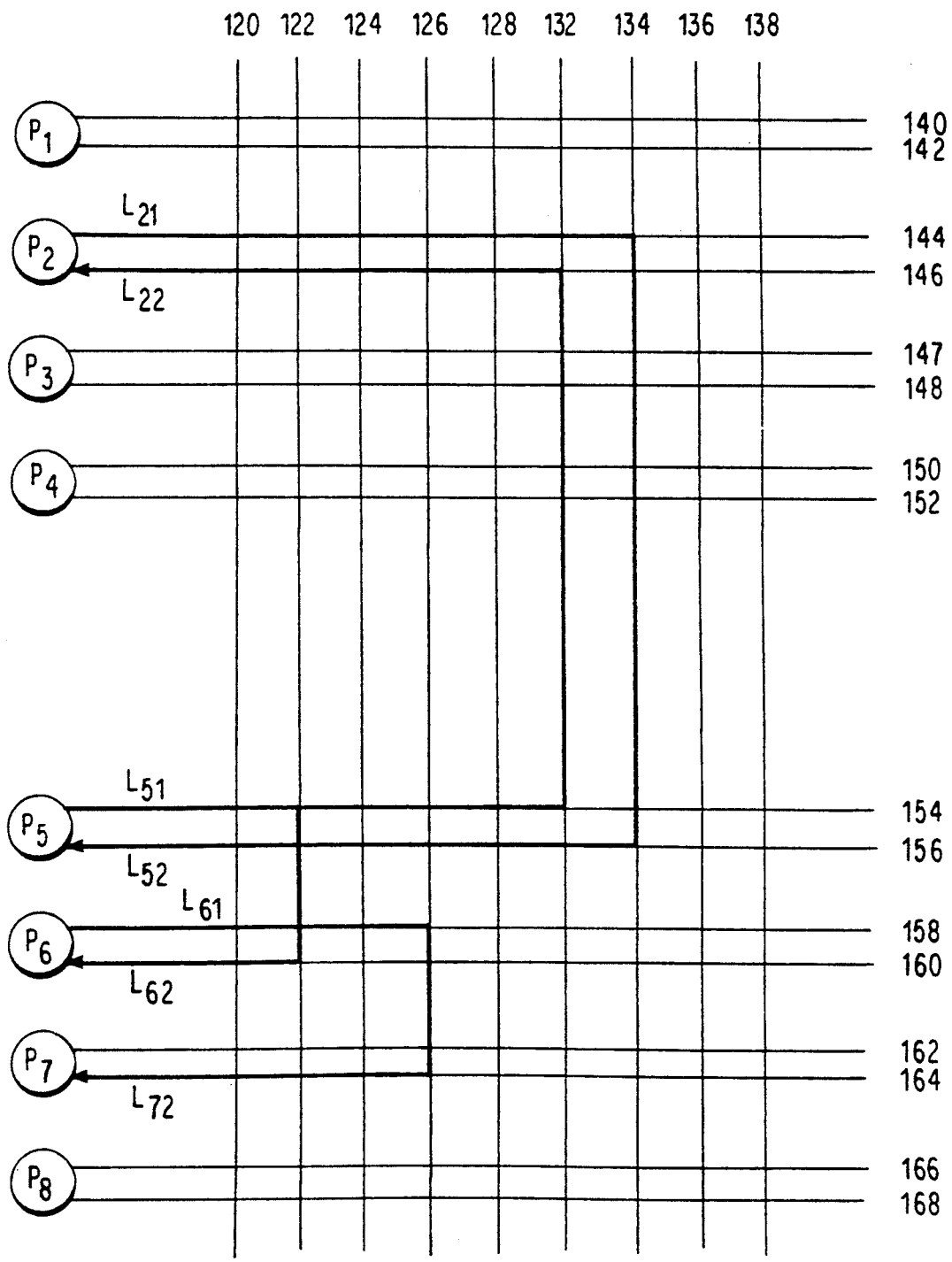
FIG. 6 is a simplified diagram showing the addition of another port to one of the wait chains illustrated in FIG. 4.

Adding a job to the queue: Suppose port $P_7$ wishes to obtain a connection to port $P_2$. The request would result in a message to controller 22 which would affect the allocation of horizontal bus 164 to establish the link $L_{72}$, as shown in FIG. 6. More specifically, link $L_{72}$ is connected to link $L_{61}$ via vertical bus 126 and horizontal bus 158, all of these connections being made by controller 22. In this way, each port in the "linked list" established by the cross-point switches themselves is notified in turn when it can begin to transmit.

In more general terms, a wait chain is defined as a set of ports $\{P_{i(j)}\}$ which are waiting to be connected to some port $P_i$, $J = 1, 2, \ldots, n$ forming an ordered list $P_{i(1)}$, $P_{i(2)}, \ldots, P_{i(n)}$, where $P_{i(1)}$ will be the next port to be connected to port $P_i$. A port $P_i$ which is waiting for, say, port $P_q$ may itself be waited on; that is, it may have its own wait chain. In the notation used, a wait chain is understood to include the port that has received a connection.

Figure 7:
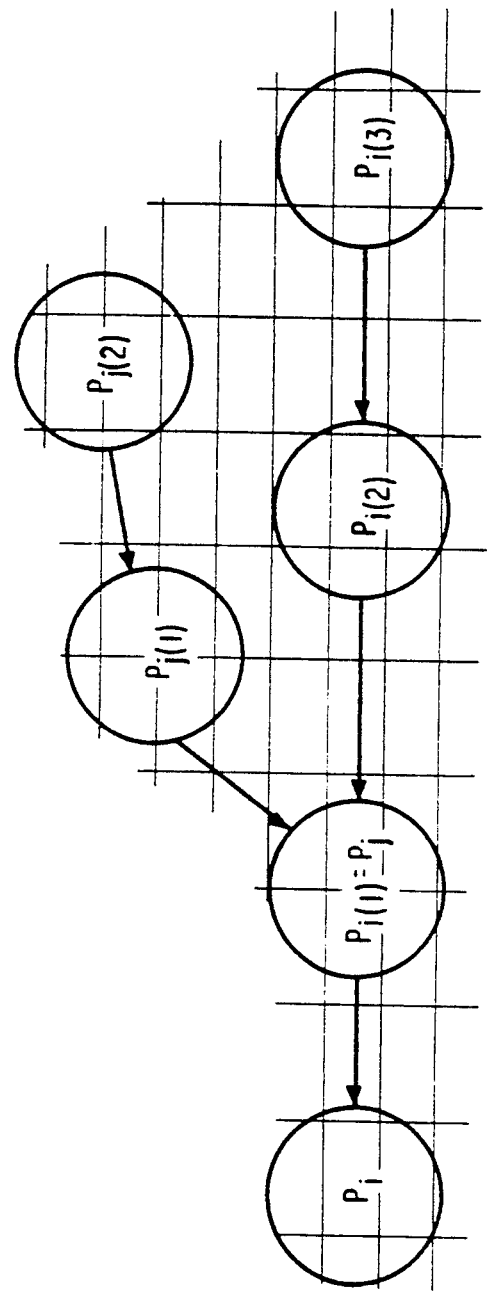
FIG. 7 is a state diagram illustrating more generally wait chains established in the practice of the invention.

For example, in the illustration of FIG. 7, ports $P_i$ and $P_j$ are each heads of wait chains. In FIG. 7, ports $P_{i(2)}$ and $P_{j(1)}$ would both be connected to the output of port $P_{i(1)}$. Therefore, when port $P_{i(1)}$ disconnects, both ports $P_{i(2)}$ and $P_{j(1)}$ respectively ask for connections to $P_i$ and $P_j = P_{i(1)}$.

$P_{i(j)}$ is waiting for $P_{i(j-1)}$, then the output of $P_{i(j-1)}$ is connected to the input of $P_{i(n)}$. Each wait chain has the identity of its last member $P_{i(n)}$ stored by the controller 22. This is so that port $P_{i(n+1)}$, the next added waiting port, can be treated appropriately.

Adding to a wait chain is simply accomplished. Say port $P_j$ requests connection to port $P_i$, and port $P_i$ is busy. If port $P_i$ currently has a wait chain, then port $P_j$ is attached to the end of that wait chain as $P_{i(n)}$, and its identity is stored as the end of the chain. Port $P_j$ is informed of its wait status, of its identity as $P_{i(n)}$ in the wait chain and of the identify of the previous $P_{i(n)}$.

Connecting a waiting port to a desired port is so easily accomplished. If, for example, $P_{i(1)}$ is currently connected to port $P_i$ and completes its connection, then the disconnect message from $P_{i(1)}$ is heard by $P_{i(2)}$, unless of course $P_{i(1)}$ is the end of the wait chain. $P_{i(2)}$ then sends a request to the controller to be connected to port $P_i$. The request includes a message that $P_{i(2)}$ is a member of the wait chain. This message prevents $P_{i(2)}$ from being added to the chain. When $P_{i(1)}$ is disconnected, the controller knows that there is a wait chain for port $P_i$, since it has the last entry stored, and therefore a requestor will not get a connection unless it identifies itself as a member of the wait chain.

It is also possible for a port to be disconnected from a wait chain. If for some reason $P_{i(r)}$ wishes to terminate its wait (an unusual occurrence in the system), it notifies the controller 22 of its request. Such a request is called an abnormal disconnect. Included in the request is the identity of the predecessor $P_{i(r-1)}$ in the wait chain, which becomes the new end of the wait chain. The next member $P_{i(r+1)}$ of the wait chain is notified of the disconnection, via the established connection in the switch 20, and requests a disconnect, as does each subsequent waiting port, in turn. After disconnection, these ports may ask to rejoin the wait chain in the above described manner.

The invention permits the creation of wait chains which can be created and taken down dynamically. Each wait chain requires storing by the controller of the identity of only the last member of the chain. This has obvious advantages in a system with multiple controllers, where a port is associated with a specific controller, or in a system with multiple switches, since controller memory can be limited. The wait chains do more than just store the identities of the waiting ports, as they are implemented via connections in the switching matrix 20 which is also used to transfer information. Thus, for example, the disconnection of $P_{i(1)}$ from port $P_i$ is automatically transmitted to $P_{i(2)}$. $P_{i(2)}$ can therefore overlap the transmission of its connect request (which may also include data to be transmitted to port $P_i$) with the processing of the disconnect request from $P_{i(1)}$. The result is lower latency. Finally, when the last member of a wait chain is disconnected (after receiving service), the wait chain is automatically eliminated.

The invention exploits the connectivity and memory of a crossbar switching matrix so as to permit the formation of a wait chain in the form of a "linked list" defined by the cross-point switches in the matrix. The alternative would be to keep a distributed (in the case of multiple controllers) queue, which would result in substantial delays and complication due to intercontroller communication and path setup. It should be noted that this basic principle of generalized path utilization in the switch could be utilized for other purposes as, for example, using the connections to form a dynamically updatable list of the n device ports which are to be in turn interrogated or provided some other service.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a switching network having ports $P_i, \ldots, P_n$, a method of establishing connections between an ordered subset $\{Q_j\}$ of said ports, where all ports of $\{Q_j\}$ desire to communicate with a port $P_i$, where i is greater or equal to one and less than or equal to n and $i = 1, 2, \ldots, n$, said method comprising the steps of:

establishing a wait chain of connections between all ports in the subset $\{Q_j\}$ by closing corresponding cross points of said network so that each port of the subset $\{Q_j\}$ can transmit control information to a respective subsequent port in the subset $\{Q_j\}$, each said subsequent port of the subset $\{Q_j\}$ being a port which is schedule to transmit to said port $P_i$;

transmitting control information generated by a disconnecting port from said disconnecting port of the subset $\{Q_j\}$ to a subsequent port of the subset $\{Q_j\}$, said control information indicating that said disconnecting port no longer desires to communicate with said port $P_i$, a disconnecting port of the subset $\{Q_j\}$ being a port which has just completed transmission to said port $P_i$; and setting cross-points in said network in response to said control information so that a respective subsequent port of the subset $\{Q_j\}$ can communicate with said port $P_i$.

2. The method recited in claim 1 wherein a port $P_n$ is added to said subset $\{Q_j\}$ further comprising the steps of:
- transmitting from said port $P_n$ a request for connection to said port $P_i$; and
- adding said port $P_n$ to said subset $\{Q_j\}$ as member $Q_n$ by connecting a preceding port of the ordered subset to port $P_n$ to receive a disconnect message from said preceding port.

3. The method recited in claim 1 wherein said subsequent port of the subset $\{Q_j\}$ receives the control information transmitted from a disconnecting port further comprising the step of transmitting by said subsequent port a request for connection with said port $P_i$ upon receipt of said control information.

4. In a communication switching system comprising a crossbar switching matrix formed of a plurality of cross-point switches for selectively connecting a plurality of ports, a method of storing in said crossbar switching matrix information as a linked list of ports to be connected in sequential order, said linked list defining a wait chain, said method comprising the steps of:
- establishing said wait chain for a first port by closing selected ones of said cross-point switches to link ports in a sequential order of connection to said first port;
- transmitting control information generated by a disconnecting port from said disconnecting port to a sequential next port in said wait chain;
- transmitting a request from said sequential next port for connection to said first port; and
- setting cross-point switches to enable communication between said sequential next port and said first port for which the wait chain is established.

5. The method recited in claim 4 wherein a plurality of wait chains are established by closing selected ones of said cross-point switches.

6. The method recited in claim 5 wherein a port in a first one of said plurality of wait chains is waited on by a second one of said plurality of wait chains.

7. The method recited in claim 4 wherein a wait chain is defined as a set of point $\{P_{i(j)}\}$ which is waiting to be conencted to some port $P_i$, $j=1,2,\ldots,n$ forming an ordered list $P_{i(1)}, P_{i(2)}, \ldots, P_{i(n)}$, where $P_{i(1)}$ will be the next port connected to port $P_i$, further comprising storing an identity of the last member $P_{i(n)}$ of the wait chain.

8. The method recited in claim 7 wherein port $P_{i(1)}$ receives the transmitted control information from a disconnecting port via said wait chain and wherein port $P_{i(1)}$ then transmits a request for connection to said port $P_i$, said transmission by port $P_{i(1)}$ including an identification of port $P_{i(1)}$ as a member of said wait chain $\{P_{i(j)}\}$.

9. A communication switching system comprising;
- a crossbar switching matrix formed of a plurality of cross-point switches for selectively connecting a plurality of ports;
- means for establishing a wait chain for a first port by closing selected ones of said cross-point switches, closed ones of said cross-point switches storing information as a linked list of ports to be connected in sequential order to said first port, said linked list defining said wait chain;
- means for transmitting control information generated by a disconnecting port from said disconnecting port to a sequential next port in said wait chain;
- means for transmitting a request from said sequential next port for connection to said first port; and
- control means for setting cross-point switches in said crossbar switching matrix to enable communication between said next port and said first port for which the wait chain is established.

10. The communication switching system recited in claim 9 wherein said means for transmitting a request transmits an identification of said next port as a member of said wait chain.

* * * * *